UNITED STATES PATENT OFFICE.

CHARLES E. POPE, OF PITTSBURG, PENNSYLVANIA.

CEMENT FLINT CLAY BRICK FOR METALLURGICAL AND OTHER PURPOSES.

944,693.  Specification of Letters Patent.  Patented Dec. 28, 1909.

No Drawing.  Application filed September 17, 1908.  Serial No. 453,497.

*To all whom it may concern:*

Be it known that I, CHARLES E. POPE, a citizen of the United States, residing at Pittsburg, Pennsylvania, have invented certain new and useful Improvements in Cement Flint Clay Brick for Metallurgical and other Uses, of which the following is a specification.

The object of the invention is to produce a cheap and economical brick of good refractory character in respect to heat, friction, and chemical agencies for use in furnaces, flues, and the like where good qualities of flint clay brick are now employed.

The brick which forms the subject-matter of the present application is composed of particles of flint clay brick and of cement clinker nodules, preferably broken, and a bond of Portland cement.

Owing to the higher heats and increased friction which are now common, many of the types of flint clay bricks, and other fire bricks which were formerly adequate for their respective intended uses are no longer able to satisfactorily stand the heats and the friction combined with the chemical attack of the gases, slags, and other agencies to which they are subjected in many furnaces and also in many flues and other places where similar materials refractory not only to heat but to friction and attendant agencies are required. The shrinkage in making bricks composed largely of alumina and the expansion and contraction in compositions largely of silica, add to the great practical difficulties of producing and firing satisfactory bricks for such uses.

Unground cement clinker nodules, preferably broken into fragments so as to present angular edges, and broken flint clay brick bats, or burnt flint clay brick material bonded together with sufficient Portland cement, make a cheap and economical refractory brick which, while readily withstanding high temperatures as high as 2500° F., are also highly resistant to the wear and tear due to excessive friction, and do not suffer from warping and changes of size due to the firing of the brick after molding in the usual flint clay brick manufacture. The intimate union between the Portland cement and the cement clinker nodules and flint clay brick fragments produces a very desirable composite brick.

In preparing the improved brick I prefer to take the cement clinker nodules just as they come from the rotary kiln and crush or break the larger masses into jagged forms, making sharp fragments. I prefer also to sort the different sizes of fragments, including smaller unbroken nodules, into two sizes, the larger of which will not pass through a mesh having one-eighth inch openings. I also take broken flint clay bats, or, if desired, specially made fragmentary pieces of burnt flint clay materials sorted into two sizes corresponding with the two sizes of broken nodules, breaking them or otherwise reducing them to such condition by means of rolls or in any other suitable way. I mix approximately three parts of the coarser and three parts of the finer of each of these two materials and then bond the whole twelve parts together with two parts of finished Portland cement, with the usual added percentage of water, forming and molding the brick in the desired forms, and then allowing it to set. The same composition may be used for repairing or making linings while it is in plastic condition, as will be well understood. The percentages given may be varied to suit considerable variations in sizes of the bats and cement clinker fragments, following principles well understood in making concretes. The proportions I have stated are those which are very satisfactory under average conditions.

This composite brick combines cheapness, refractory qualities, and the advantage of contracting or warping very much less when subjected to high temperatures than flint clay brick.

What I claim and desire to secure by patent is:

1. Refractory brick composed of approximately three parts coarse cement clinker nodules, three parts relatively fine nodules, three parts coarse flint clay brick, three parts fine flint clay brick, and a bond of two parts Portland cement.

2. Refractory brick composed of approximately equal parts of cement clinker nodules and flint clay brick bonded together with Portland cement.

3. Refractory brick comprising sharp broken cement clinker nodules and flint clay brick fragments bonded with Portland cement.

4. Refractory brick comprising cement clinker nodules and flint clay brick bonded with Portland cement.

In testimony whereof I have signed this specification in the presence of two subscribing witnesses.

CHARLES E. POPE.

Witnesses:
  JAMES S. DOUTHITT,
  WM. F. BILLINGER, Jr.